Figure 1:
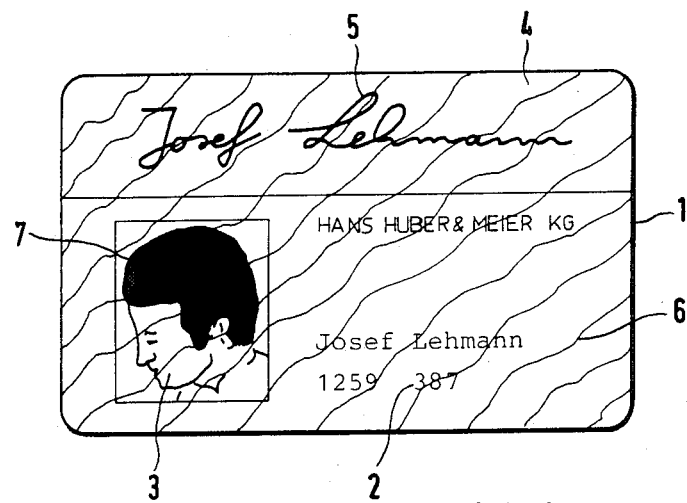

United States Patent [19]

Maurer et al.

[11] Patent Number: 4,629,215

[45] Date of Patent: Dec. 16, 1986

[54] IDENTIFICATION CARD AND A METHOD OF PRODUCING SAME

[75] Inventors: Thomas Maurer; Hans J. Holbein, both of Munich, Fed. Rep. of Germany

[73] Assignee: GAO Gesellschaft fuer Automation und Organisation mbH, Fed. Rep. of Germany

[21] Appl. No.: 636,617

[22] Filed: Aug. 1, 1984

Related U.S. Application Data

[63] Continuation of Ser. No. 330,816, Dec. 15, 1981, abandoned.

[30] Foreign Application Priority Data

Dec. 23, 1980 [DE] Fed. Rep. of Germany ....... 3048735

[51] Int. Cl.$^4$ ............................................. B42D 15/00
[52] U.S. Cl. ......................................... 283/94; 283/70; 283/72; 283/75
[58] Field of Search .................. 283/72, 75, 86, 94, 283/97, 110, 111, 70; 156/292, 308.4

[56] References Cited

U.S. PATENT DOCUMENTS

| | | | |
|---|---|---|---|
| 1,457,805 | 6/1923 | Woodhull | 283/72 |
| 2,932,913 | 4/1960 | Hannon | 156/308.4 |
| 3,417,497 | 12/1968 | Hannon | 283/94 |
| 3,552,853 | 1/1971 | Sanders et al. | 283/86 |
| 3,620,590 | 11/1971 | Barker | 283/86 |
| 3,647,275 | 3/1972 | Ward | 283/70 |
| 3,873,813 | 3/1975 | Lahr et al. | 283/72 |
| 4,126,373 | 11/1978 | Moraw | 283/70 |
| 4,278,722 | 7/1981 | Hoppe et al. | 283/94 |
| 4,324,421 | 4/1982 | Moraw et al. | 283/75 |
| 4,504,083 | 3/1985 | Devrient | 283/75 |

Primary Examiner—Paul A. Bell
Assistant Examiner—Paul M. Heyrana, Sr.
Attorney, Agent, or Firm—Robert J. Koch

[57] ABSTRACT

The disclosure concerns an identification card containing information such as name, account number, photo of the card owner, etc. The card is protected by a superjacent printed security pattern, such as a guilloche, or other pattern which is difficult to imitate, or a homogeneous printed surface. The information is inscribed into the identification card material through the printed security pattern by a laser beam recorder. The energy of the laser and the colors of the printed security pattern are coordinated with each other in such a way that the laser light is not absorbed by the printed security pattern and the latter is not destroyed by the laser light.

14 Claims, 2 Drawing Figures

U.S. Patent  Dec. 16, 1986  4,629,215

IDENTIFICATION CARD AND A METHOD OF PRODUCING SAME

This is a continuation of application Ser. No. 330.816, filed Dec. 15, 1981 abandoned.

The invention relates to an identification card having information applied in the form of letters, numbers and/or images, whereby the information is protected by a printed security pattern or something similar printed over it, and a method of producing same.

Identification cards in the form of credit cards, bank card, cash payment cards, etc., are employed increasingly in all kinds of service sectors, cashless transfers and within enterprises. Due to their extensive use, they are typical mass production items, on the one hand, i.e. their production must be simple and economical; on the other hand, they must be designed in such a way that they are protected against forgery and falsification to as great a degree as possible. The numerous kinds of identification cards now on the market and still in a developing stage testify to the efforts of the relevant industry to optimize these two contradictory conditions.

It is especially necessary that the data relating to the card owner, which are applied during the so-called personalization of the identification card, be protected in such a way that they cannot be manipulated afterwards. One possibility which has proved very useful in practice is to embed a paper inlay designed as a security print into a multilayer card. The paper inlay with its authenticity features such as watermarks, security threads, steel intaglio printing, etc., which are known in the production of security papers, meets the highest standards of security and is protected against all kinds of attempted forgery and falsification due to the protection of the data by transparent cover films.

The Swiss Patent No. 477 066 and the German Offenlegungsschrift No. 29 07 809 corresponding to U.S. Pat. No. 4,504,083 describe additional protection against manipulation as well as a further very effective way of marking the authenticity of this type of identification card. These patent applications mention identification cards in which in particular the photographic areas of the card are protected by a security pattern arranged on top of the photographic area.

Mainly because of their much simpler and cheaper production, all-plastic identification cards are used in the identification card sector as well, in which the identification card data and the general printed pattern are applied to the outer surface of a plastic card, which may also have a multilayer construction, if desired. In various forms of execution of this kind of identification card the data relating to the user (name, account number, etc.) are impressed through the back of the identification card so as to be in relief on the front. This allows for the transfer of the personalization data onto bills and so on by means of an ink ribbon in the various stores. The raised areas of the impression are colored so as to improve the legibility of the impressed data.

In spite of the economical advantages of this type of allplastic identification card, it has proved to be particularly disadvantageous that the directly accessible printed pattern as well as the personalization data are relatively unprotected against attempted falsification. The impressed data can be manipulated, for example, by being "ironed flat" and then imprinted over with other data. The printed pattern can be removed, if necessary, with chemical solvents that are available everywhere, and then replaced or added to by another printed pattern.

The production of total forgeries is usually possible with extremely simple methods since up to now practically no security techniques are known in the case of all-plastic identification cards which are economically feasible, on the one hand, and can be checked by anyone without auxiliary means and cannot be imitated by means of readily available devices and materials, on the other.

In order to solve this problem of lack of protection against forgery and falsification, all kinds of security features have already been proposed, such as codings embedded inside the identification card which are "readable" by IR light, holographic storage methods, etc. All these techniques, however, have the great disadvantage that they cannot be checked without elaborate auxiliary means and are thus not accessible to the man on the street.

The German Patentschrift 29 07 004 corresponding to U.S. Pat. No. 4,544,181, taking the problems of security and production into consideration, also discloses an identification card having a paper inlay and a transparent cover film, in which the personal data are inscribed onto the card layer by means of a laser beam after the cover film has been laminated on. The information can be burned into the card inlay in this way, but it can also be present in the form of a discoloration of a thermosensitive coating applied to the inlay.

This type of card offers a high degree of protection against forgery and falsification since the data are protected on the one hand by the cover film against direct access and on the other hand by almost all the authenticity and protection features customary in the production of security paper.

Since burning on the identification card data more or less destroys the structure of the material, on the one hand, and this type of data must thus be protected against direct mechanical stress, but the discoloration present in a coating is relatively easy to remove or manipulate, on the other hand, when it is directly accessible, the identification card personalization does not appear feasible in the way described above in the case of identification cards in which the data are directly accessible on the outer surface.

The invention is thus based on the problem of providing an identification card which can be produced easily and economically and still has a high standard of security.

This problem is solved according to the invention by providing a security pattern which is completely or almost completely permeable for the light of a laser recorder which is specified for each case.

In a particularly preferred embodiment the identification card is designed as an all-plastic identification card in which the security pattern is provided on the outer, directly accessible surface of the identification card and the data applied by means of a laser recorder are burned into the plastic surface of the identification card through the security pattern.

In a development of the invention, the security pattern is arranged in such a way that it at least partially overlaps with the data of the identification card which are particularly in need of protection.

In the method of producing and personalizing identification cards according to the invention, the security pattern is applied to the identification card before the latter is personalized. The personalization data, etc., are then recorded by means of a laser recorder through the security pattern.

An appropriate arrangement of the security pattern and a proper choice of inks allow for the data applied by means of the laser recorder to be arranged at least partly beneath the security pattern and thus be accessible to checking through the latter.

The method of producing and personalizing identification cards according to the invention is based on the finding that various colorants which are very visible in the visible range of the spectrum, i.e. reflect relatively well for various wavelength ranges of the visible spectrum, are, however, completely or almost completely "invisible" for the wavelength or radiation of a laser, i.e. very permeable for these wavelengths. The act of writing on a data carrier provided with this type of security pattern by means of a laser recorder thus takes place "from the point of view of the laser" as though the security pattern were not present. The laser writing therefore appears to the visual observer to have been already provided before the application of the security pattern.

The identification cards according to the invention have numerous advantages, as is quite obvious. They are extremely safe in spite of their simple basic construction and economic production, which is limited to simple printing techniques as in the case of usual identification cards. This protection is due to the fact that the appearance of the cards is very essentially marked by the laser writing technique and the security pattern arranged on top of the laser writing, the essential features thus obtained cannot be imitated by other techniques and the presence and undamaged state of the essential features can be checked without auxiliary means. As the technically very high quality laser recorders to be used according to the invention for the personalization of the cards are only available in a few places, a high degree of protection against both falsification and total forgery is the result. The production and personalization of identification cards is possible using the usual techniques by merely employing inks having the proper effect. A changeover for the new cards does not require any basically novel production equipment for the card producers. Furthermore these cards can be personalized decentrally and subsuquently to the actual production of the cards, as can those stated in the German Patentschrift No. 29 07 004.

A further important advantage has proved to be the fact that the proposals according to the invention also allow for the very effective protection of all-plastic identification cards against falsification, since the identification card data are very effectively protected by the security pattern on top of them and manipulation is obvious to anybody in the form of damage to or changes in this printed pattern.

As is described in detail in a parallel application, the surprising finding has been made that writing on a plastic film with a laser recorder can be made much more resistant to chemical and mechanical influences by means of local solidification or oxidation processes and so on than the surroundings that are not written on. This results in the additional advantage that precisely the areas of the identification card which are particularly in danger of being manipulated are especially resistant to such attempts due to this increased "resistance". As the security pattern on top of them is not or hardly affected by the writing process, the "laser data" are protected by a much more sensitive and possibly very elaborately constructed security feature, which is therefore very difficult to imitate. A change in the data can thus be prevented additionally in a very effective way even when the identification card 1 data are directly accessible on the outer surface of the identification card.

Although the identification cards provided with a security paper inlay cannot be matched in their degree of protection and aesthetic appearance by all-plastic identification cards or similar identification cards, the invention does point out a way of uniting some of the safety features of the known identification card having a security paper inlay with some of the economic features of the all-plastic identification card.

Figure 2:
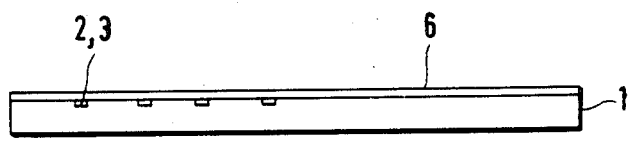

In the following some embodiments of the invention are described by way of example on the basis of the adjoined drawings. These show:

FIG. 1 an identification card according to the invention from the top,

FIG. 2 a schematic representation of an identification card according to the invention in cross-section.

FIG. 1 shows an all-plastic identification card 1 according to the invention having personalization data 2, a photo 3, a signature strip 4 provided with a signature 5 from the hand of the card owner, and a security pattern 6 overlapping the personalization data. The security pattern 6 is designed as a guilloche in the present case, which, as is commonly known, consists of a very fine and complicated line pattern which can only be achieved with great effort and is thus almost impossible to imitate. The security pattern is applied to the outer surface of the front of the card. It covers the surface of the card over a large area and thus overlaps the identification card data beneath it at many places.

As is shown schematically in FIG. 2, the personalization data 2,3 are burned relatively deeply into the surface of the card. The depth of this burning in depends on the available writing energy, the writing time and the identification card material that is being used. It can be varied from case to case and adjusted within limits to various needs by varying the parameters mentioned. As can also be seen in FIG. 2, the personalization data 2,3 are arranged beneath the security pattern 6 (shown here as a continuous layer) which can also be designed as a homogeneous color layer, if need be, by using transparent inks. Due to the relatively high transparency of the inks used for the printing of the security pattern which are selected in the preferred form of execution, the data 2,3 applied by means of the laser recorder can also be fully recognized through this color layer. As the security printing inks are almost completely permeable for the laser light, the security printing does not exhibit any visually noticeable damage after personalization even in areas 7 that are "written on" over a large surface.

As the personalization data 2,3 are inscribed without any transition into the surface of the identification card by discoloring the identification card material, it is practically only possible to change these data afterwards by scratching out the particular local areas and thus destroying the surface of the identification card. As the security pattern 2,3 is arranged on top of these data and is much weaker if only because of its layer thickness, the data 2,3 can obviously never be changed without destroying the security pattern 6. Manipulation therefore necessarily leads to the destruction of the surface of the identification card, which can be noticed and checked by anyone without any auxiliary means, even in the embodiments shown in the figures.

What is claimed is:

1. An identification document comprising:
   a base card;
   identification information on said base card, said information being applied directly to said base card by a laser recorder;
   a security pattern covering said base card in areas to be protected wherein said identification information is beneath the security pattern and visible without any auxiliary equipment;
   colorants in said security pattern visibly unchangeable by the radiation of a laser recorder wherein said identification information is recorded through the security pattern without destroying said security pattern.

2. The identification document of claim 1, wherein said security pattern extends over a large area of said base card.

3. The identification document of claim 2, wherein said security pattern extends substantially over the entire surface area of said base card.

4. The identification document of claim 1, wherein said identification information is selected from the group consisting of letters, numbers, images and combinations thereof.

5. The identification document of any one of claims 1, 2 or 3, wherein said security pattern is a printed security pattern.

6. The identification document of claim 5, wherein said printed security pattern is designed as a guilloche pattern.

7. The identification document of claim 5, wherein said printed security pattern is in the form of continuous printed areas.

8. The identification document of claim 7, wherein a guilloche pattern at least partially overlaps said continuous printed areas.

9. An identification document having identification information in the form of letters, numbers, images and combinations thereof comprising:
   a base card;
   means for covering said base card in an area to be protected wherein said means for covering is a visible security pattern;
   identification information applied to said base card through said security pattern by means of a laser recorder controlled so that the radiation of said laser recorder during application of said identification information does not visibly change said visible security pattern;
   wherein said identification information is beneath said security pattern and visible without any auxiliary equipment.

10. The identification document of claim 9, wherein said security pattern is printed on said base card.

11. The identification document of claim 10, wherein said security pattern is printed over an entire face of said base card.

12. The identification document of claim 9, wherein said printed security pattern covers only partial areas of said base card.

13. The identification document of any one of claims 10, 11, or 12 wherein said security pattern is printed in a continuous pattern.

14. The identification document of any one of claims 10, 11 or 12 wherein said security pattern is printed in a guilloche pattern.

* * * * *